United States Patent
Tsunehara et al.

(10) Patent No.: US 7,280,521 B2
(45) Date of Patent: Oct. 9, 2007

(54) ACCESS POINT APPARATUS FOR A SYSTEM FOR DETERMINING THE LOCATION OF A TERMINAL AND A TERMINAL LOCATION DETERMINING METHOD

(75) Inventors: Katsuhiko Tsunehara, Hachioji (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 633 days.

(21) Appl. No.: 10/790,005

(22) Filed: Mar. 2, 2004

(65) Prior Publication Data

US 2004/0214521 A1    Oct. 28, 2004

(30) Foreign Application Priority Data

Apr. 23, 2003    (JP)    ............................. 2003-117761

(51) Int. Cl.
    *H04Q 7/24*    (2006.01)
(52) U.S. Cl. .................... 370/338; 370/412; 455/456.1
(58) Field of Classification Search ........... 342/357.08, 342/357.1; 370/235, 338, 394, 428, 473, 370/412, 395.7; 455/3.01, 456.1–456.6; 711/167, 217, 218
See application file for complete search history.

(56) References Cited

U.S. PATENT DOCUMENTS

| | | | | |
|---|---|---|---|---|
| 5,293,645 | A | * | 3/1994 | Sood ........................ 455/456.2 |
| 6,108,553 | A | * | 8/2000 | Silventoinen et al. .... 455/456.3 |
| 6,473,435 | B1 | * | 10/2002 | Zhou et al. ................. 370/428 |
| 6,965,566 | B2 | * | 11/2005 | Kawasaki et al. .......... 370/235 |

FOREIGN PATENT DOCUMENTS

JP    2002-14152    1/2002
WO    WO 02/30089 A2    4/2002

OTHER PUBLICATIONS

2003 IEICE General Meeting, B-5-203, "Integrated Wireless LAN Access System (1) Study on Location System", p. 662.

* cited by examiner

*Primary Examiner*—Chris Kelley
*Assistant Examiner*—Abdias Mondesir
(74) *Attorney, Agent, or Firm*—Mattingly, Stanger, Malur & Brundidge, P.C.

(57) ABSTRACT

In an access point apparatus for a wireless LAN system equipped with a terminal location detecting function, memory capacity required for the access point apparatus is reduced. A received signal memory control module controls access such that a memory space of a received signal memory can be reused by performing sequentially overwrite operation while stopping capturing of the received signal in response to a packet detection signal outputted from a packet detecting module.

16 Claims, 8 Drawing Sheets

ACCESS POINT APPARATUS FOR A SYSTEM FOR DETERMINING THE LOCATION OF A TERMINAL AND A TERMINAL LOCATION DETERMINING METHOD

BACKGROUND OF THE INVENTION

1. Field of the Invention

The present invention generally relates to a wireless LAN (Local Area Network) system. More particularly, the present invention is concerned with an access point apparatus for measuring or determining the current location or position of a mobile terminal in the wireless LAN system by making use of a radio signal. Incidentally, the access point apparatus may also be referred to as the access point station or base station in more general terms.

2. Description of the Related Art

For better understanding of the concept underlying the present invention, description will firstly be made of background techniques of the invention. As a method of measuring or determining the current location of a terminal with the aid of a radio signal used in the wireless LAN system, there can be mentioned a method which is disclosed in A. Ogino et al's article "INTEGRATED WIRELESS LAN ACCESS SYSTEM, (1) STUDY ON LOCATION SYSTEM" in "The Collection of Lecture Drafts in the General Convention of The Institute of Electronics, Information and Communication Engineers in Japan (2003)", B-5-203, p.662. In the following, description will be made of the configuration and operation of the wireless LAN access point apparatus (base station) disclosed in the Ogino et al reference.

FIG. 9 of the accompanying drawings is a schematic diagram which shows, by way of example, a configuration of a wireless LAN system equipped with a terminal locating facility (i.e., function for determining a location or position of a terminal). A plurality of access point apparatuses or base stations (e.g. three access point apparatuses 1, 2 and 3 in the case of the LAN system illustrated in FIG. 9) are connected to a server 6 by way of a network 5 constituted by a public network and a mobile communication network. The terminal denoted by reference numeral 4 performs transaction of information or data with the server 6 through the medium of these access point apparatuses or base stations.

A processing flow for determining the location of the terminal 4 in the LAN system shown in FIG. 9 will be described below. The terminal 4 transmits or sends a radio signal. The access point apparatuses or base stations 1, 2 and 3 receive the radio signal to execute the signal processing which is required for determining the location of the terminal. In addition, each of the access point apparatuses 1 to 3 informs the server 6 of the result of the above-mentioned signal processing as executed via the network 5. On the basis of the signal processing result received from the individual access point apparatuses or stations, the server 6 arithmetically determines the location of the terminal 4.

FIG. 10 of the accompanying drawings is a block diagram showing generally a structure of a hitherto known or conventional access point apparatus for realizing the processing flow mentioned above. Referring to the figure, a signal receiving unit 101 is designed to perform a reception processing at a high/intermediate frequency corresponding to the radio signal received via an antenna 100, a demodulation processing of a base-band signal and an AD conversion (Analog to Digital conversion) to thereby generate a received signal.

On the other hand, a received signal memory control module 106 is so designed or programmed as to perform an access control for storing the received signal generated by the signal receiving unit 101 in a received signal memory 102 in response to a capture start command messaged from a terminal location determining signal processing module 103 via a signal line 104. In that case, the received signal memory control module 106 holds as a capture start timing the timing which is indicated by a clock 107 when storage of the received signal in the received signal memory 102 is started. In this conjunction, the clock 107 may be constituted, for example, by a counter which operates under the timing of a clock signal used in the access point apparatus.

Next, referring to FIGS. 11 and 12 of the accompanying drawings, description will turn to an access control method carried out by the received signal memory control module 106 in the conventional access point apparatus or station. It is assumed that the storage of the received signal is started at a timing $T_{p0}$ shown in FIG. 11. In that case, the received signal memory control module 106 firstly stores the timing $T_{p0}$ as the capture start timing. In addition, the received signal memory control module 106 stores the received signal at the timing $T_{p0}$ in the received signal memory 102 at an address $A_{p0}$, as shown in FIG. 12. In this conjunction, the address $A_{p0}$ may be a predetermined address or alternatively it may be designated by the terminal location determining signal processing module 103 upon issuance of the capture start command from the terminal location determining signal processing module 103. In succession, the received signal memory control module 106 carries out the access control such that the received signal is stored sequentially in the received signal memory 102 at the addresses $A_{p0+1}$, $A_{p0+2}$, ... in this order, as is illustrated in FIG. 12. When the received signal has been stored up to the address $A_{p1}$ in the received signal memory 102, the received signal memory control module 106 terminates or ends the process of storing the received signal in the received signal memory 102. Incidentally, the address $A_{p1}$ may be a predetermined address or alternatively it may be designated by the terminal location determining signal processing module 103 when the received signal capture start command is issued by the terminal location determining signal processing module 103.

Upon completion of the storage of the received signal in the received signal memory 102, the received signal memory control module 106 sends a received signal capture end message and the capture start timing to the terminal location determining signal processing module 103 via a signal line 105.

Upon reception of the capture end message mentioned above, the terminal location determining signal processing module 103 executes the signal processing required for arithmetically determining the location of the mobile terminal on the basis of the received signal stored in the received signal memory and the capture start timing mentioned above, the result of the signal processing being then messaged or transferred to the server 6 shown in FIG. 9. As the signal processing required for the arithmetic determination of the location or position of the mobile terminal, there can be mentioned a processing for arithmetically determining the reception timing of the signal sent from the terminal, a processing for arithmetically determining a delay profile for the determination of the reception timing, etc. In this conjunction, it should be added that a matched filter, for example, may be employed for the arithmetic determination of the delay profile. Further, for arithmetically deriving the reception timing of the received signal from the delay profile as obtained, a method disclosed in e.g. JP-A-2002-14152 may be adopted. Alternatively, the received signal stored in the received signal memory 102 may be intactly transferred to the server 6 without executing any particular processing on the received signal stored in the received signal memory 102.

The server 6 then arithmetically determines the location or position of the terminal on the basis of the results of the signal processings sent from the individual access point apparatuses (base stations) 1, 2 and 3 by resorting to, for example, a trilateration method described, for example, in the Ogino et al reference cited hereinbefore.

SUMMARY OF THE INVENTION

The wireless LAN system is a packet communication system. Consequently, a packet signal exists locally within a certain or given time zone and does not exist in the other time zone. Under the circumstances, there may arise such situation that with the hitherto known or conventional access point apparatus such as described above, the packet signal sent to the access point apparatuses from the terminal 4 for the location determination thereof can not be stored in the received signal memory 102. By way of example, in the case of a situation illustrated in FIG. 13, the access point apparatus stores the received signal in the received signal memory 102 during a period or session extending from a point $T_{p2}$ to a timing $T_{p3}$. However, a packet signal 200 sent from the terminal 4 exists within a time zone extending from a timing $T_{p4}$ to a timing $T_{p5}$. Consequently, the received signal containing the packet signal 200 can not be stored in the received signal memory 102. In general, in the packet communication, the delay time may remarkably vary in dependence on increase/decrease or change of the traffic volume in the communication channel. For this reason, the situation in which the delay time of the packet increases will frequently take place, incurring such undesirable situation as illustrated in FIG. 13. In that case, the relevant access point apparatus or station is incapable of sending to the server 6 the information useful for determination of the terminal location, as a result of which accuracy and reliability of the terminal locating arithmetic procedure executed by the server 6 will suffer degradation.

For coping with the problem mentioned above, there may be conceived a method of storing in the received signal memory 102 the received signal of a temporal duration lengthened to an extent sufficient for absorbing the variation of the delay time of the packet signal. By way of example, by capturing the received signal over the period or session (from the timing $T_{p6}$ to $T_{p7}$) long enough to cover the variation of the packet delay time, as is illustrated in FIG. 14, the packet signal 200 (having a duration $T_{p8}$ to $T_{p9}$) sent from the terminal for determination of the location thereof can be stored in the received signal memory 102. In this conjunction, the contents of the received signal stored in the received signal memory 102 are illustrated in FIG. 15. It can be seen that in the received signal stored in the received signal memory 102, the packet signal 200 exists only in the memory space delimited by the addresses $A_{p8}$ and $A_{p9}$ inclusive, while in the other memory spaces (addresses $A_{p6}$ to $A_{p8-1}$ and $A_{p9+1}$ to $A_{p7}$), there exists no signals except noise signals. The signal which can be used for determination of the location of the terminal is only the packet signal 200. Consequently, the memory space in which the noise signals are stored can not contribute to the location determination of the terminal. This means that the utilization efficiency of the received signal memory 102 is degraded. As a consequence, the memory capacity demanded by the access point apparatus or base station increases correspondingly, which in turn incurs increase of the cost involved in implementation and operation or running of the access point apparatus, and hence cost of the location information service provided by the wireless LAN system will eventually increase, whereby convenience of the location information service is lowered.

The related art of the invention which has been described by reference to FIGS. 9 to 15, however does not mean admission in the U.S. statute.

Thus, in light of the state of art described above, an object of the present invention is to provide an improved access point apparatus in which the problems mentioned above are successfully and satisfactorily solved.

In view of the above and other objects which will become apparent as the description proceeds, there is provided according to a general aspect of the present invention an access point apparatus for a terminal locating system for determining a location of a terminal on the basis of a timing at which a radio packet signal sent from the terminal is received.

The access point apparatus mentioned above comprises a signal receiving unit for receiving the radio packet signal to thereby generate a received signal, a received signal memory for storing the received signal, a packet detection module for detecting a packet contained in the generated received signal, a received signal memory control module for performing a received signal write control for writing the received signal in the received signal memory from the signal receiving unit and a read control unit for reading out the received signal from the received signal memory, and a clock for correlating the received signal and time in the access point apparatus.

The received signal memory control module is so arranged as to perform such control that the received signal is written in the received signal memory sequentially from a first address and after writing of the received signal in the received signal memory at a second address, the received signal is again written in the received signal memory sequentially from the first address while writing of the received signal in the received signal memory is stopped in response to detection of a packet contained in the received signal by the packet detecting module.

The reception timing of the radio packet signal is determined on the basis of the received signal readout and the time in the wireless LAN access point apparatus.

With the arrangement of the access point apparatus according to the present invention described above, the received signal memory control module is so designed as to control the access made to the access point apparatus (base station) such that the memory space can be reused by sequentially performing overwrite operation on the received signal memory. In addition, the received signal memory control module is designed to stop capturing of the received signal in response to the packet detection signal issued by the packet detecting means.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DETAILED DESCRIPTION OF THE EMBODIMENTS

The present invention will be described in detail in conjunction with what is presently considered as typical embodiments thereof by reference to the drawings.

Figure 1:
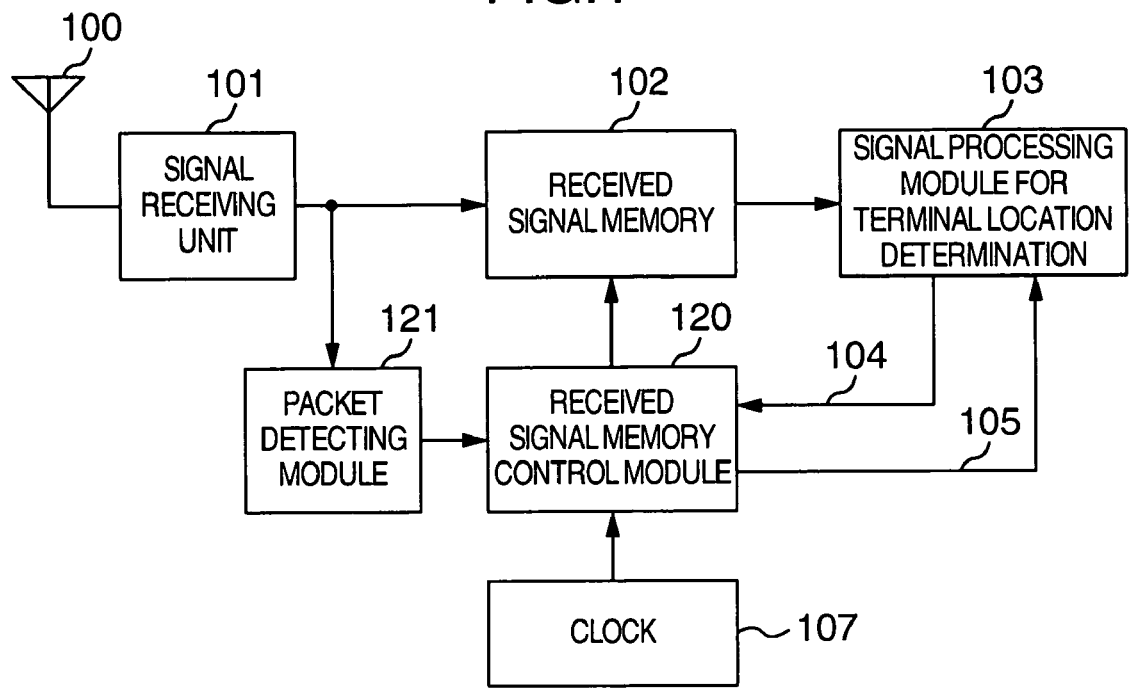
FIG. 1 is a block diagram showing generally and schematically a circuit configuration of a wireless LAN access point apparatus to which the present invention is applied.

FIG. 1 shows generally and schematically a configuration of the access point apparatus (base station) to which the teachings of the present invention are applied. In the figure, components same as or equivalent to those described hereinbefore in conjunction with the conventional access point apparatus are denoted by like reference numerals. At this juncture, it should be firstly be mentioned that implementation of the signal receiving unit in the access point apparatus or station is not always essential for the present invention. It is sufficient for realization of the present invention that the terminal unit is so arranged as to make use of the reception timing of the down-link radio signal, as will become apparent as the description proceeds. Referring to FIG. 1, a signal receiving unit 101 performs a reception processing at a high/intermediate frequency corresponding to the radio signal received via an antenna 100, a demodulation processing of a base-band signal and an AD (Analog-to-Digital) conversion to thereby generate a received signal.

Figure 2:
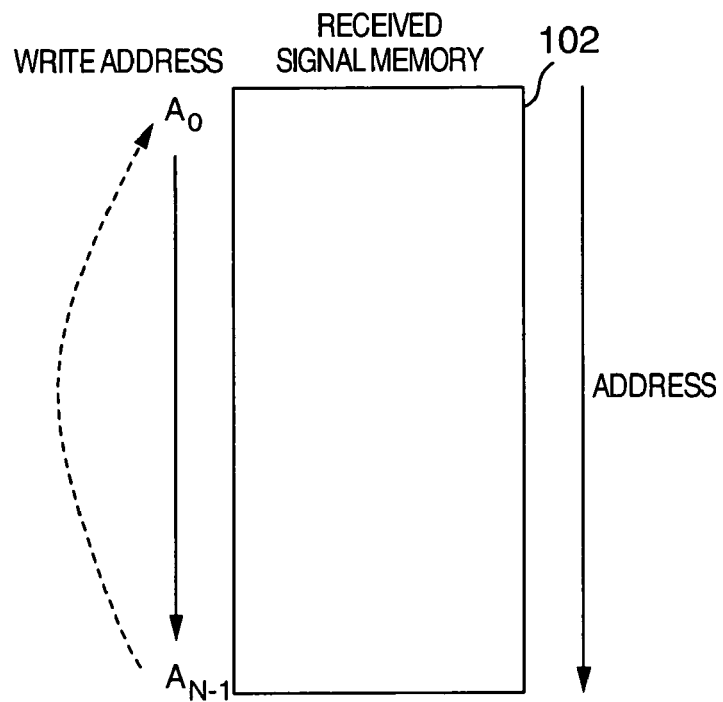
FIG. 2 is a view for illustrating a method of accessing a received signal memory in the above-mentioned wireless LAN access point apparatus.

A received signal memory control module 120 starts to capture the received signal generated by the signal receiving unit 101 in a received signal memory 102 in response to a capture start command issued by a signal processing module for terminal location determination 103 and transmitted via a signal line 104. A method of writing the received signal in the received signal memory 102 by means of a received signal memory control module 120 is shown in FIG. 2. As can be seen from this figure, the received signal memory control module 120 firstly writes the received signal sequentially in a memory space extending from a leading write address $A_0$ to an address $A_{N-1}$. Upon completion of writing of the received signal up to the address $A_{N-1}$, the received signal memory control module 120 carries out an access control for the received signal memory 102 so that the succeeding received signal is written at the address $A_0$. The received signal memory control module 120 repeats the operation mentioned above. In this manner, the access control for the received signal memory 102 is executed such that the received signal is repetitionally written in the memory space extending from the address $A_0$ to the address $A_{N-1}$, as is illustrated in FIG. 2.

The received signal memory control module 120 stops the capture of the received signal in the received signal memory 102 upon reception of a packet detection signal issued by a packet detecting module 121. By virtue of this method, the packet can be stored with high efficiency with a small memory capacity independently of the length of the time period during which the received signal is captured. Thus, so far as the memory capacity is equivalent to at least one packet or equivalent to the signal length required for determining the reception timing of the packet, the position or location of the terminal can be detected by carrying out the packet communication according to the method of the present invention. Even when the time and margin involved in the packet detection processing is taken into account, the memory capacity about twice as large as that of the packet will be sufficient for the determination of the terminal location.

Figure 3:
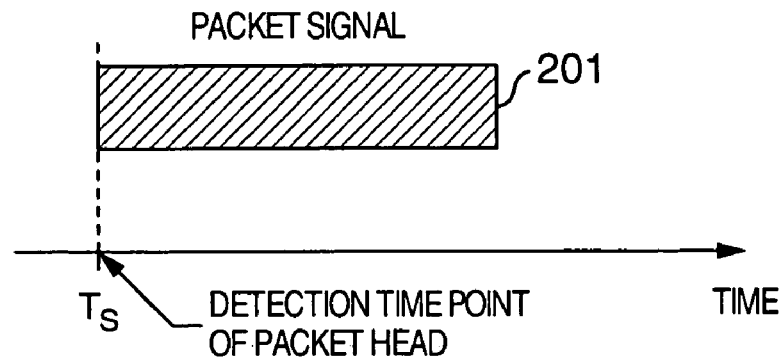
FIG. 3 is a view for illustrating a packet detection in a capture stop method according to a first embodiment of the present invention.
Figure 4:
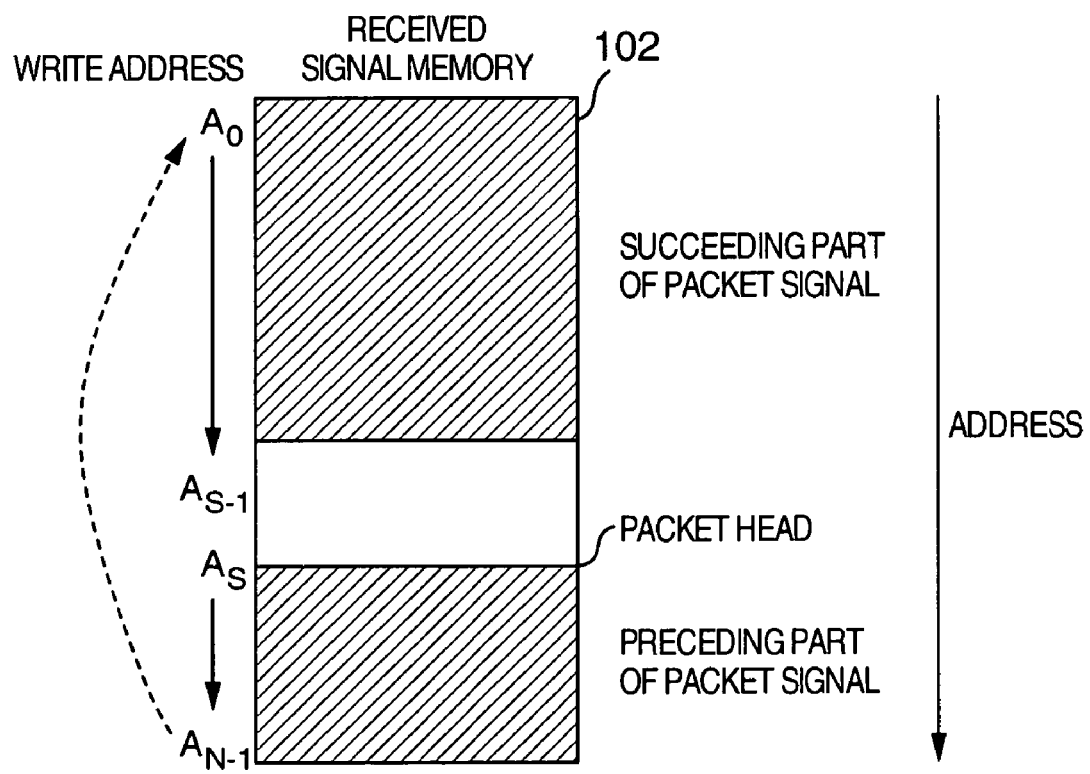
FIG. 4 is a view for illustrating a method of accessing a received signal memory in the capture stop method according to the first embodiment of the present invention.

Now referring to FIGS. 3 and 4, description will be directed to a method of stopping the capture of the received signal through cooperation of the packet detecting module 121 and the received signal memory control module 120 according to a first embodiment of the present invention. As shown in FIG. 3, the packet detecting module 121 is designed to detect a leading portion or edge of a packet signal 201 arrived at the access point apparatus (base station) at a timing $T_S$ and message the detection of the packet head to the received signal memory control module 120. For detecting the leading edge of the packet signal, there can be mentioned a method of making decision as to whether or not the received power increases steeply beyond a threshold value, to thereby determine the detection of the leading edge of the packet signal when the threshold value is exceeded. Alternatively, such a detection method may equally be adopted according to which a correlation value of the received signal and a predetermined preamble pattern is arithmetically determined by using e.g. a matched filter or the like for thereby detecting a preamble affixed to the leading of the packet signal. Upon reception of the message informing the detection of the packet head from the packet detecting module 121, the received signal memory control module 120 stops capturing the received signal. This operation will be elucidated below by reference to FIG. 4. It is assumed that a received signal of the leading edge (the timing $T_S$) of the packet signal 201 which is detected by the packet detecting module 121 is written in the received signal memory 102 at an address $A_S$, as shown in FIG. 4. In response to reception of the message informing the detection of the packet head, the received signal memory control module 120 executes writing of the received signal up to an address $A_{S-1}$ in accordance with the access control method described previously by reference to FIG. 2, whereupon capturing of the received signal is terminated. Furthermore, the received signal memory control module 120 records as a packet head address the address $A_S$ at which the received signal is written at the timing when the message of detection of the packet head is received from the packet detecting module 121. Moreover, the received signal memory control module 120 records as a packet head timing the timing $T_S$ indicated by the clock 107 at the timing when the message of detection of the packet head is received from the packet detecting module 121. In this conjunction, it should also be added that the received signal memory control module 120 may be so arranged as to record instead of recording the timing $T_S$ a timing indicated by the clock 107 when capturing of the received signal was started and a count value resulting from counting the number of times the received signal has been written at the address $A_0$ during the period or session from the start of capturing the received signal to the end thereof.

Figure 5:
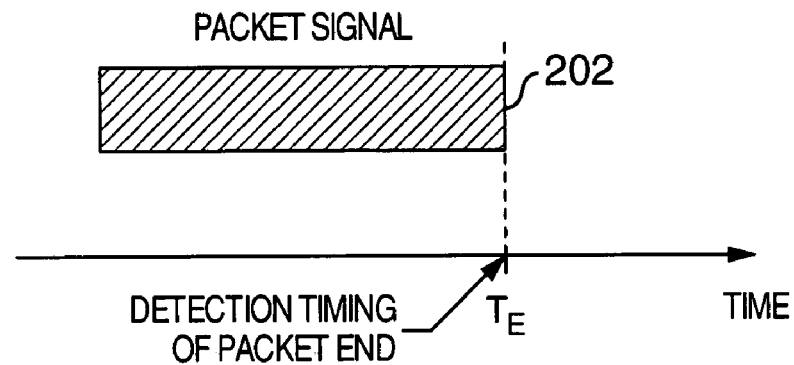
FIG. 5 is a view for illustrating a packet detection in the capture stop method according to a second embodiment of the present invention.
Figure 6:
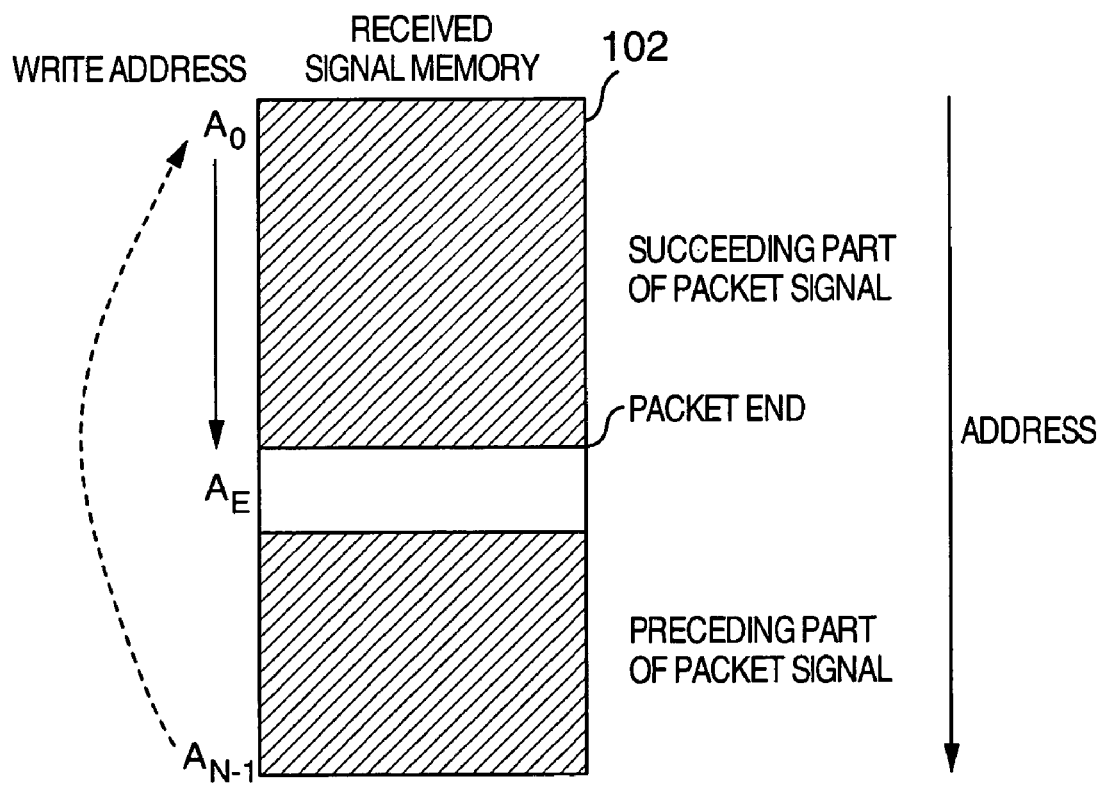
FIG. 6 is a view for illustrating a method of accessing the received signal memory in the capture stop method according to the second embodiment of the present invention.

Next, referring to FIGS. 5 and 6, description will be directed to the method of stopping the capture of the received signal effected through cooperation of the packet detecting module 121 and the received signal memory control module 120 according to a second embodiment of the present invention. As shown in FIG. 5, the packet detecting module 121 is designed to detect a trailing portion or edge of a packet signal 202 arrived at the access point apparatus (base station) and message the detection of the packet end to the received signal memory control module 120. For detecting the trailing edge of the packet signal, there can be mentioned a method of making decision as to whether or not the received power decreases steeply below a threshold value, to thereby determine the detection of the trailing edge of the packet signal when the received power becomes lower than the threshold value. Upon reception of the message informing the detection of the packet end from the packet detecting module 121, the received signal memory control module 120 stops capturing the received signal. This operation will be elucidated below by reference to FIG. 6. The received signal memory control module 120 is so designed that when the received signal of the trailing edge (timing $T_E$) of the packet signal 202 as detected by the packet detecting module 121 is written in the received signal memory 102 at an address $A_E$, as shown in FIG. 6, capturing of the received signal is immediately terminated. Furthermore, the received signal memory control module 120 records as a packet end address the address $A_E$ at which the received signal is written at the timing when the message of detection of the packet end was received from the packet detecting module 121. Moreover, the received signal memory control module 120 records as a packet end timing the timing $T_E$ indicated by a clock 107 when the message of detection of the packet end was received from the packet detecting module 121. In this conjunction, it should also be added that the received signal memory control module 120 may be so arranged as to record instead of the timing $T_E$ a timing indicated by the clock 107 when capturing of the received signal was started and a count value resulting from counting the number of times the received signal has been written at the address $A_0$ during the period or session the start of capturing the received signal to the end thereof.

Figure 7:
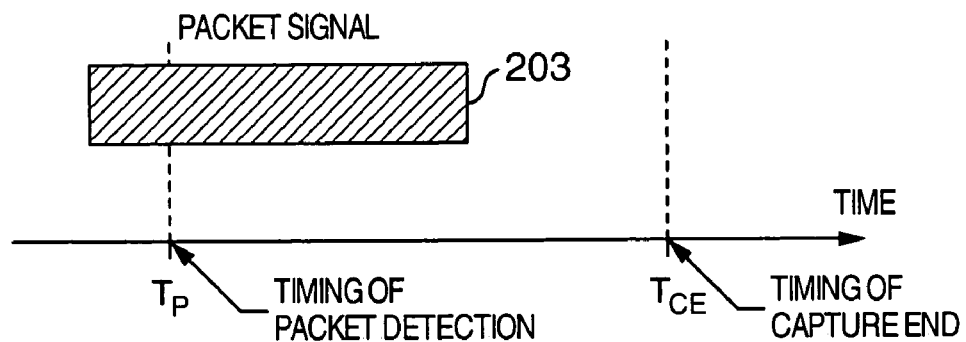
FIG. 7 is a view for illustrating a packet detection in the capture stop method according to a third embodiment of the present invention.
Figure 8:
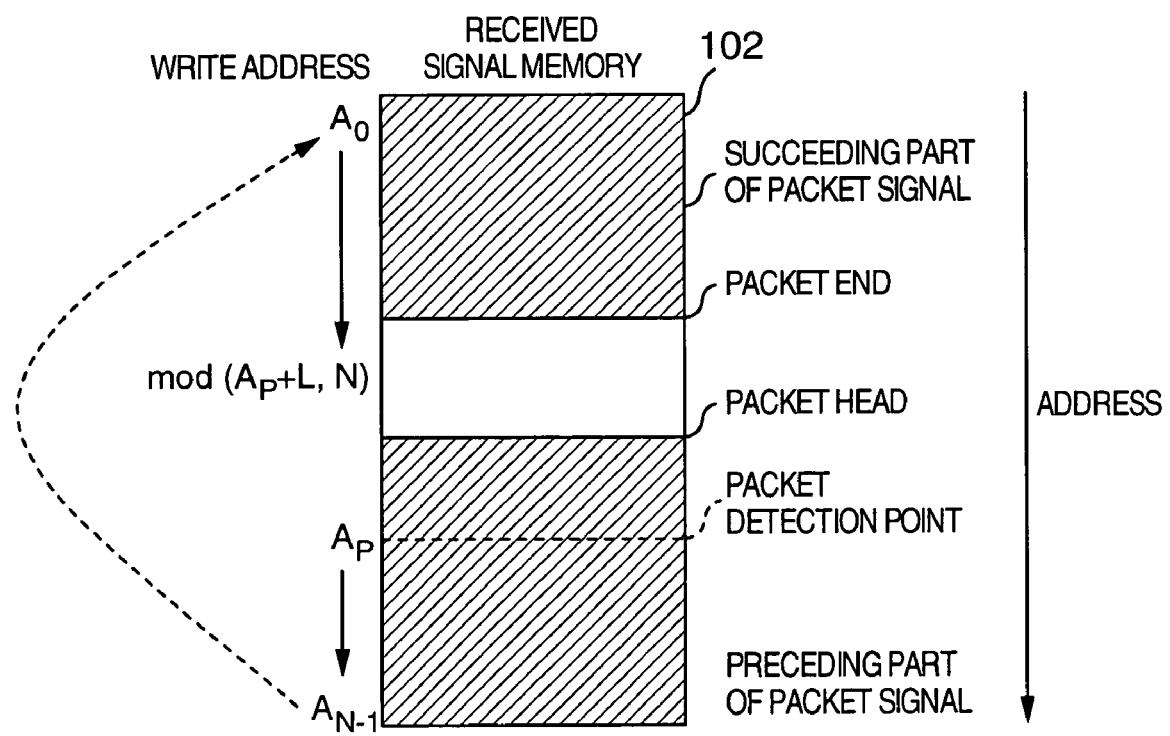
FIG. 8 is a view for illustrating a method of accessing the received signal memory in the capture stop method according to the third embodiment of the present invention.

Referring to FIGS. 7 and 8, description will be directed to the method of stopping the capture of the received signal effected through cooperation of the packet detecting module 121 and the received signal memory control module 120 according to a third embodiment of the present invention. Referring to FIG. 7, the packet detecting module 121 detects a packet signal 203 arrived at the access point apparatus (base station) at an intermediate portion of the packet (timing $T_p$) and messages the detection of the packet to the received signal memory control module 120. For detecting the packet at the intermediate portion thereof, as mentioned above, there can be adopted, for example, a method of monitoring the received signal power for a predetermined period and making decision as to whether or not a mean value of the received power exceeds a threshold value. When the mean value of the received power exceeds the threshold value, it can then be decided that the packet signal has been detected. Upon reception of the message informing the detection of the packet signal from the packet detecting module 121, the received signal memory control module 120 stops capturing the received signal. This operation will be elucidated below by reference to FIG. 8. At this juncture, it is assumed that the received signal at the timing $(T_p)$ at which the packet signal 203 was detected by the packet detecting module 121 has been written in the received signal memory 102 at an address $A_p$, as shown in FIG. 8. In response to the message of the packet detection, the received-signal memory control module 120 writes the received signal additionally at L addresses in accordance with the access control method described hereinbefore by reference to FIG. 2, whereupon capture of the received signal comes to an end. Thus, the final address at which the received signal has been written is represented by "mod $(A_p+L, N)$", where "mod $(X, Y)$" indicates a remainder resulting from division of "X" by "Y", and "N" represents the number of addresses existing in the memory space extending from the address A0 to the address $A_{N-1}$. Further, "L" represents a value which can be determined in advance or alternatively the value contained in the capture start command issued by the location determining signal processing module 103. Further, the received signal memory control module 120 records as a packet detection address the address $A_p$ at which the received signal has been written when the message of packet detection was received from the packet detecting module 121. In addition, the received signal memory control module 120 records as a packet detection timing the timing $T_p$ indicated by the clock 107 when the message of the packet detection is received from the packet detecting module 121. Alternatively, the received signal memory control module 120 may be so arranged as to record as a capture end address the address "mod $(A_p+L, N)$" at the timing when capturing of the received signal is terminated while recording as a capture end timing the timing TCE indicated by the clock 107 when capturing of the received signal is stopped. In this conjunction, it should also be mentioned that the received signal memory control module 120 may be so arranged as to record instead of recording the timings $T_P$ and $T_{CE}$ mentioned above the timing indicated by the clock 107 when capturing of the received signal was started and a count value resulting from counting the number of times the received signal has been written at the address $A_0$ during the period or session extending from the start of capturing the received signal to the end thereof.

Upon completion of capturing the received signal in the received signal memory 102, the received signal memory control module 120 issues to the terminal location determining signal processing module 103 via the signal line 105 a message of completion of the received signal capturing as well as the timings indicated by the clock 107 and the addresses of the received signal memory 102 as recorded in the course of execution of the received signal capture stopping method described above.

In response to reception of the capture end message mentioned above, the terminal location determining signal processing module 103 reads out sequentially the received signals from the received signal memory 102, starting from the temporally earliest received signal.

More specifically, when the capture stopping method according to the first embodiment of the present invention is adopted, the terminal location determining signal processing module 103 reads out the received signal from the received signal memory 102, starting from the packet head address $A_S$ informed when the capture end message is sent from the received signal memory control module 120 up to the address $A_{S-1}$ in accordance with the access control method illustrated in FIG. 2.

on the other hand, when the capture stopping method according to the second embodiment of the present invention is adopted, the terminal location determining signal processing module 103 reads out the received signal from the received signal memory 102, starting from an address $A_{E+1}$ which succeeds to the packet end address $A_E$ informed upon reception of the capture end message from the received signal memory control module 120 up to the address $A_E$ in accordance with the assess control method described hereinbefore by reference to FIG. 2.

Furthermore, when the capture stopping method according to the third embodiment of the present invention is adopted, the terminal location determining signal processing module 103 arithmetically determines at first the address "mod ($A_p$+L, N)" written upon completion of the received signal capturing on the basis of the packet detection address $A_p$ informed by the capture end message from the received signal memory control module 120. Alternatively, in the case where the capture end address "mod ($A_p$+L, N)" is informed in the capture stopping method according to the third embodiment of the present invention, this address may be used intactly as the write address at the end of the capturing process. In succession, the terminal location determining signal processing module 103 reads out the received signal, starting from the address which succeeds to the write address at the end of the capturing process, i.e., the address "mod ($A_p$+L, N)+1", up to the address "mod ($A_p$+L, N)" in accordance with the access control method described hereinbefore in conjunction with FIG. 2.

Figure 9:
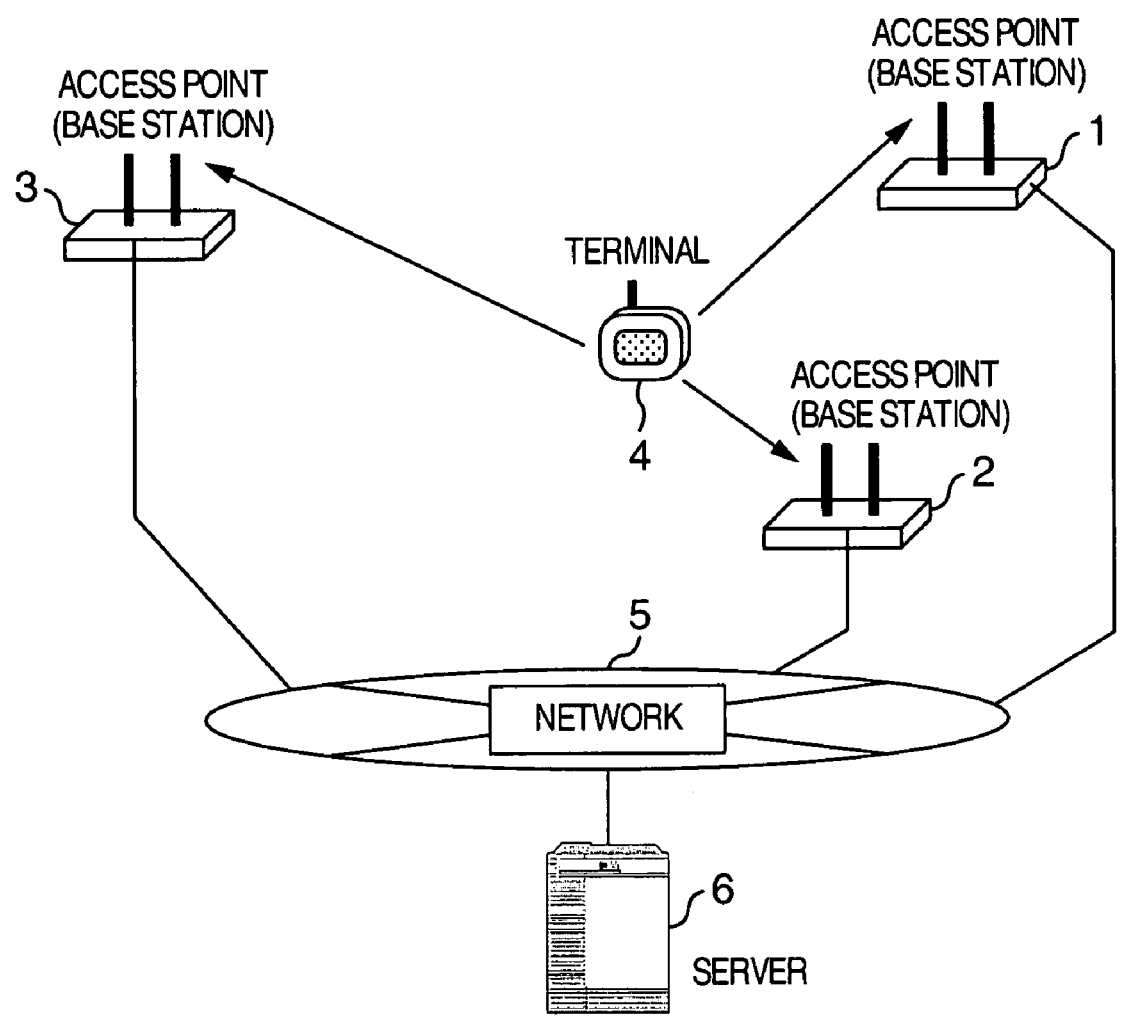
FIG. 9 is an view for illustrating an example of a wireless LAN system equipped with a terminal location determining facility, to which the present invention is applied.
Figure 10:
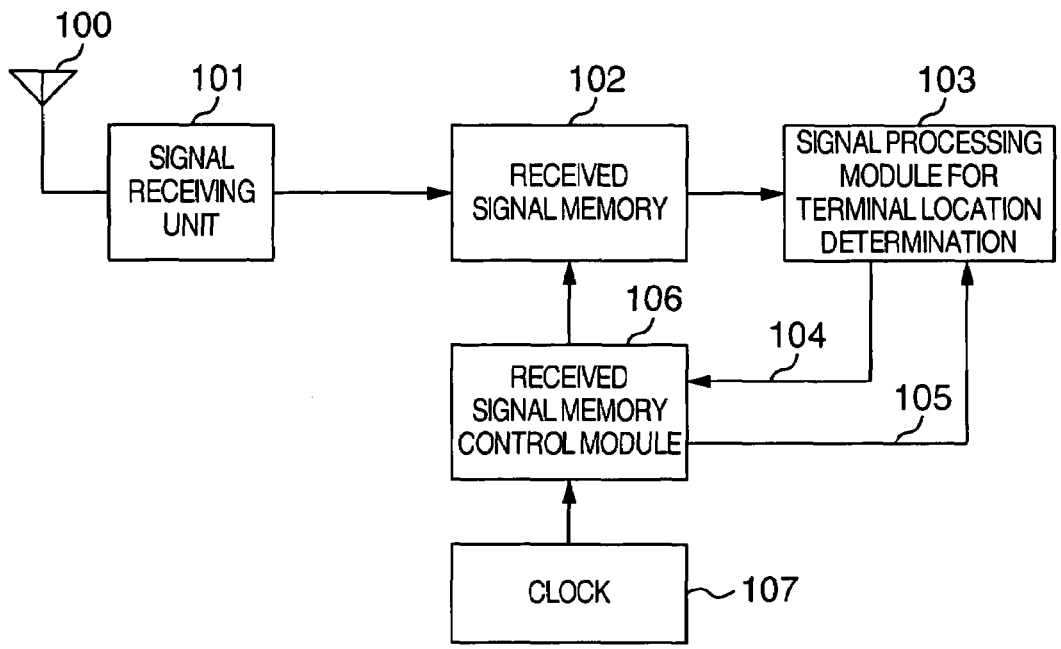
FIG. 10 is a block circuit diagram showing a conventional wireless LAN access point apparatus.
Figure 11:
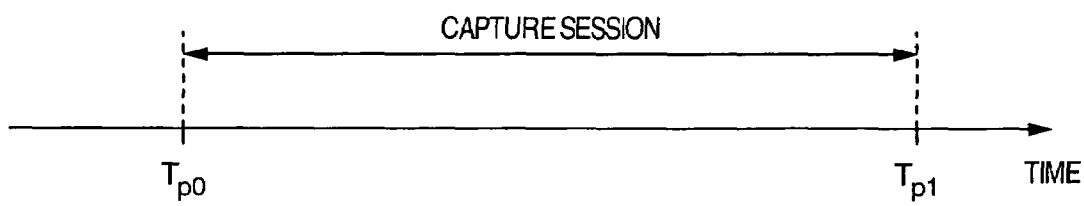
FIG. 11 is a view for illustrating a conventional received signal capturing method.
Figure 12:
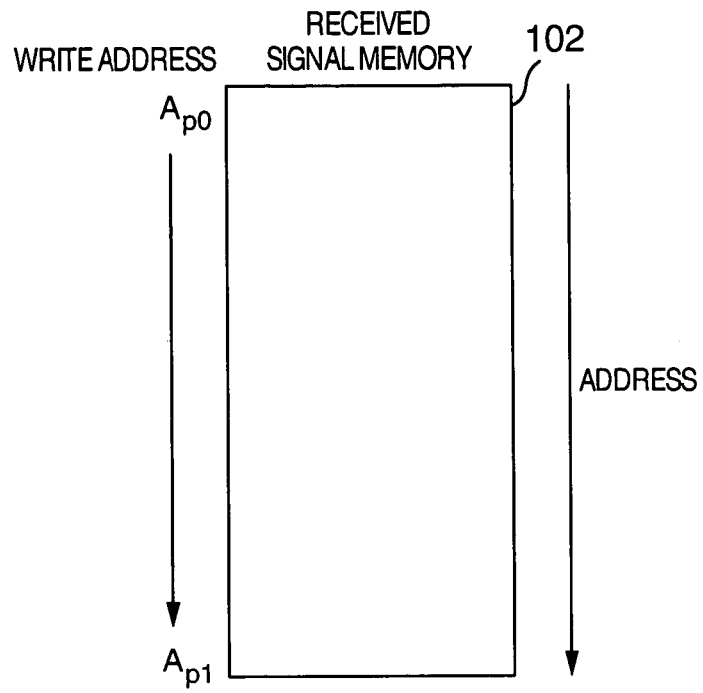
FIG. 12 is a view for illustrating a conventional method of accessing a received signal memory.
Figure 15:
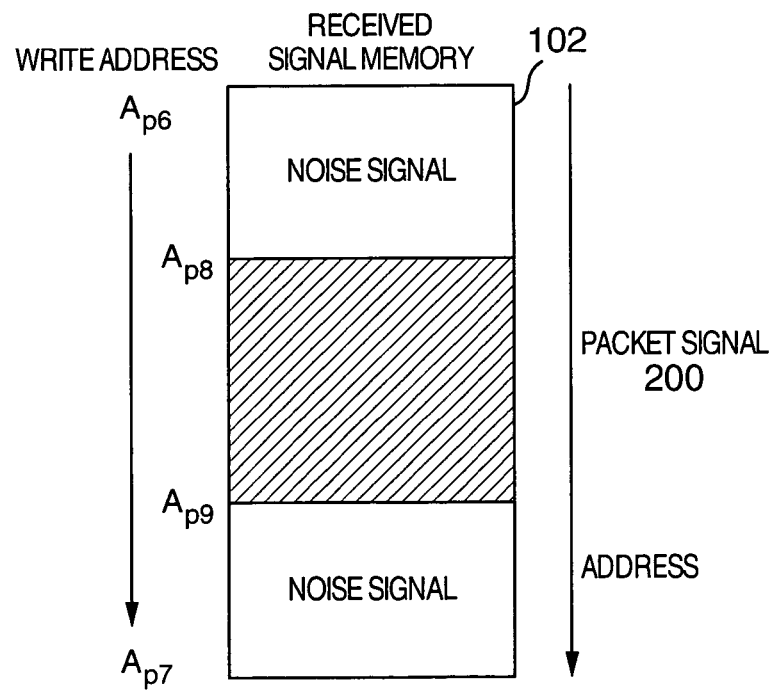
FIG. 15 is a view for illustrating a state where the received signal memory is used in the conventional wireless LAN access point apparatus.
Figure 13:
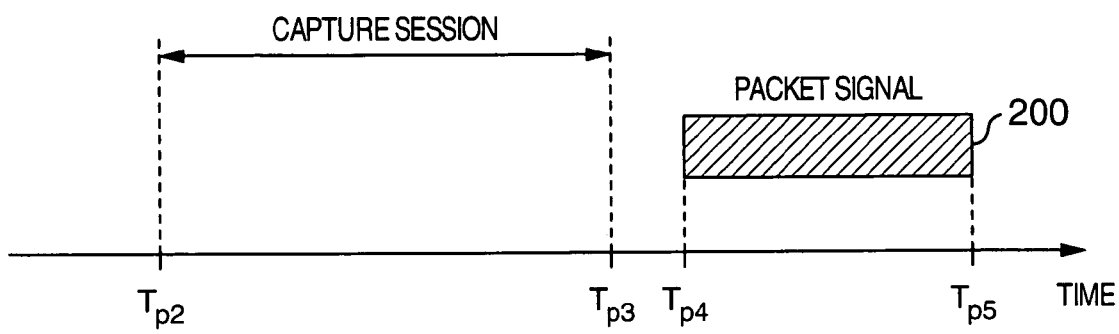
FIG. 13 is a view for illustrating a case where no packet exists in a capture session.
Figure 14:
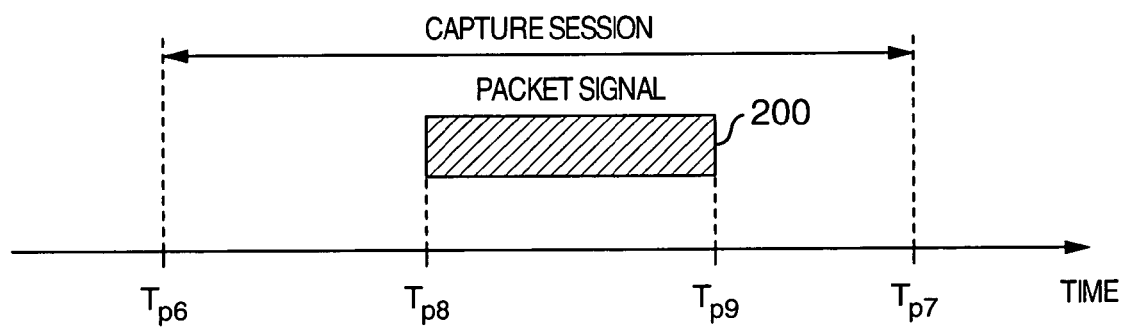
FIG. 14 is a view for illustrating a case where a packet exists within the capture session.

After having read out the received signal by resorting to the method described above, the terminal location determining signal processing module 103 executes the signal processing required for arithmetically determining the position or location of the mobile terminal as in the case of the conventional access point apparatus (base station) described hereinbefore, the result of which is transferred to the server 6 shown in FIG. 9. At this juncture, it should be noted that the signal processing mentioned above is executed by using the timings at which the leading and trailing edges of the packet were detected or alternatively the timing at which the packet being received was detected. As the signal processing required for the terminal locating arithmetic, there can be mentioned arithmetical determination of the timing at which the signal from the terminal was received or the delay profile for computing the reception timing or the like. For the arithmetic determination of the delay profile, the matched filter, for example, may be employed. Furthermore, for arithmetically determining or computing the reception timing of the received signal on the basis of the delay profile as acquired, there may be adopted a method disclosed in e.g. JP-A-2002-14152. Alternatively, the stored received signal may be intactly transferred to the server 6 without executing any particular processing on the received signal held in the received signal memory 102.

The server 6 arithmetically determines the position or location of the terminal in accordance with a method similar to that mentioned hereinbefore in conjunction with the background techniques.

Alternatively, capturing of the packet may be stopped after lapse of a predetermined time since the timing at which the packet was detected. By way of example, in the case of the first embodiment of the present invention, the packet capture may be carried out till the time taken for receiving one packet after detection of the packet has elapsed. Further, in the case of the second embodiment of the present invention, the packet capturing may be carried out until the time determined by subtracting the time period for averaging the received power from the time taken for receiving one packet has elapsed after the packet detection.

Owing to the teachings of the present invention described above, the memory capacity packaged in the access point apparatus (base station) for capturing the received signal can be reduced, which of course leads to cost reduction of the access point apparatus and hence to reduction of cost involved in the location information service provided by the wireless LAN system while enhancing the serviceableness and probitability thereof.

An example of the memory capacity reduction will be described below in the concrete.

By way of example, let's consider detection of the location of a terminal in a system implemented in conformance with the Wireless LAN Standards IEEE802.11b. According to the Standards IEEE802.11b, each of the individual packets ordinarily has a length or duration on the order of 0.2 msec. to 19 msec. in dependence on the amount of data and the transmission rate. When the packet of about 1 msec. is employed for locating the terminal (i.e., for determining the position or location of the terminal), the packet mentioned above corresponds to the memory capacity of 0.7 Mbits on the assumption that the sampling frequency is e.g. 44 MHz and that the bit width of in-phase component and quadrature component, respectively, is e.g. 8 bits.

In the case where the location detection is performed by using the above-mentioned packet, the memory employed in the conventional access point apparatus (base station) for capturing the received signal is required to have the capacity capable of storing the received signal at least for a session of about 200 msec. in consideration of the time taken for the communication between the server and the access point apparatus as well as the communication between the access point apparatus and the terminal and additionally the delay time of the packet which depends on the traffic volume on the network. On the above assumption that the sampling frequency is e.g. 44 MHz and that the bit width of in-phase component and quadrature component, respectively, is e.g. 8 bits, the packet mentioned above corresponds to the memory capacity of 140 Mbits.

By contrast, in the case of the access point apparatus (base station) implemented in accordance with the teachings of the present invention, it is sufficient that the memory for capturing the received signal has a capacity capable of storing the received signal of the duration twice as long as the packet length or 2 msec. at maximum, which means that the memory capacity is 1.4 Mbits on the sampling conditions mentioned above. The reason why the capacity exceeds the packet length can be explained by the fact that the response performance and margin involved in the packet detection has to be taken into account. It is thus apparent that according to the teachings of the present invention, the capacity of the memory for capturing the received signal in the access point apparatus can be reduced by a factor of 1/100 or so when compared with the hitherto known access point apparatus.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An access point apparatus for a terminal locating system for determining a location of a terminal on the basis of a reception timing at which a radio packet signal sent from said terminal is received at said point apparatus, said access point apparatus comprising:
a signal receiving unit for receiving said radio packet signal to thereby generate a received signal;
a received signal memory for storing said received signal;
a packet detecting unit for detecting a packet contained in said generated received signal;
a received signal memory control unit for performing a received signal write control for writing said received signal in said received signal memory from said signal receiving unit and a read control for reading out said received signal from said received signal memory; and
a clock unit for associating said received signal and a reception timing in said access point apparatus,
wherein said received signal memory control unit is so arranged as to perform such control that said received signal is written in said received signal memory at addresses sequentially from a first address; after writing of said received signal in said received signal memory at a second address, writing of said received signal continues in said received signal memory sequentially from said first address; and writing of said received signal in said received signal memory is stopped in response to detection of the packet contained in said received signal by said packet detecting unit, and
wherein said radio packet signal reception timing is determined on the basis of said readout received signal and the associated reception timing in said access point apparatus.

2. An access point apparatus according to claim 1, wherein said packet detecting unit is so designed as to generate a packet detection signal by detecting a leading edge of the packet contained in said received signal.

3. An access point apparatus according to claim 2, wherein said received signal memory control unit is so arranged as to control such that the received signal is being written in said received signal memory at a third address at a timing when said packet detection signal arrives from said packet detecting unit, writing of said received signal being further continued, and after writing of said received signal has been continued up to an address immediately preceding to said third address, writing of said received signal in said received signal memory from said signal receiving unit is stopped.

4. An access point apparatus according to claim 1, wherein said packet detecting unit is so designed as to generate a packet detection signal when a trailing edge of the packet contained in said received signal is detected.

5. An access point apparatus according to claim 4, wherein said received signal memory control unit is so arranged as to control such that after the received signal has been written in said received signal memory at a timing when said packet detection signal arrives from said packet detecting unit, writing of said received signal in said received signal memory from said signal receiving unit is stopped.

6. An access point apparatus according to claim 1, wherein said packet detecting unit is so designed as to generate a packet detection signal by detecting the packet contained in said received signal at an intermediate portion of said packet.

7. An access point apparatus according to claim 6, wherein said received signal memory control unit is so arranged as to control such that the received signal is being written in said received signal memory at a timing when said packet detection signal arrives from said packet detecting unit, and after continuing to write said received signal of a predetermined length, writing of said received signal in said received signal memory from said signal receiving unit is stopped.

8. An access point apparatus according to claim 1, wherein said reception memory control unit is so arranged as to determine a start address or an end address for reading out the received signal from said received signal memory or both of said addresses on the basis of the address at which said writing of the received signal is stopped.

9. An access point apparatus according to claim 1, wherein said received signal read out from said received signal memory and the associated reception timing in said access point apparatus are transmitted to a server connected to a plurality of said access point apparatuses and designed for performing detection of said reception timing and a terminal locating arithmetic operation for determining location of said terminal.

10. An access point apparatus according to claim 1, wherein detection of said reception timing is performed to transmit the detected reception timing to a server connected to a plurality of said access point apparatuses and designed for performing a terminal locating arithmetic operation for determining location of said terminal.

11. An access point apparatus according to claim 1, wherein said received signal memory is so designed that a memory capacity not exceeding a double size of said packet signal is allocated for storing said packet signal.

12. A wireless terminal locating method for determining a location of a wireless terminal on the basis of a reception timing at which a packet signal sent from said wireless terminal is received by an access point station, including a memory for holding said received signal, comprising the steps of:
writing said received signal in said memory sequentially from a first address thereof,
continuing writing of the received signal from said first address when said received signal has been written up to a second address inclusive;
stopping writing of said received signal at a third address determined on the basis of a timing when the packet signal sent from said wireless terminal is detected in said received signal;
reading out said written received signal from a fourth address determined on the basis of said detection timing;

measuring the reception timing of said packet by extracting said packet signal from the received signal read out; and arithmetically determining the location of said wireless terminal based on said reception timing.

13. A wireless terminal locating method according to claim 12, wherein detection of said packet signal is performed on the basis of received power of said received signal.

14. A wireless terminal locating method according to claim 13, wherein detection of said packet signal is performed on the basis of a result of measurement of said received power over a predetermined period.

15. A wireless terminal locating method according to claim 12, wherein detection of said packet signal is realized by detecting start of reception of said packet signal or alternatively by detecting end of reception of said packet signal.

16. A wireless terminal locating method according to claim 15, wherein detection of said packet signal is performed on the basis of received power of said received signal.

* * * * *